United States Patent
Tatat et al.

(10) Patent No.: US 10,330,879 B2
(45) Date of Patent: Jun. 25, 2019

(54) AERIAL MICROMODULE OPTICAL CABLE AND A METHOD OF MANUFACTURING SAID CABLE

(71) Applicant: Draka Comteq BV, Amsterdam (NL)

(72) Inventors: Olivier Tatat, Paron (FR); Jean-Marc Testu, Paron (FR)

(73) Assignee: DRAKA COMTEQ B.V., Amsterdam (NL)

( * ) Notice: Subject to any disclaimer, the term of this patent is extended or adjusted under 35 U.S.C. 154(b) by 0 days.

(21) Appl. No.: 15/737,471

(22) PCT Filed: Jun. 26, 2015

(86) PCT No.: PCT/IB2015/001714
§ 371 (c)(1),
(2) Date: Dec. 18, 2017

(87) PCT Pub. No.: WO2016/207687
PCT Pub. Date: Dec. 29, 2016

(65) Prior Publication Data
US 2018/0172937 A1    Jun. 21, 2018

(51) Int. Cl.
*G02B 6/44* (2006.01)
(52) U.S. Cl.
CPC .......... *G02B 6/4432* (2013.01); *G02B 6/4417* (2013.01); *G02B 6/4422* (2013.01); *G02B 6/4484* (2013.01)
(58) Field of Classification Search
None
See application file for complete search history.

(56) References Cited

U.S. PATENT DOCUMENTS

| | | | |
|---|---|---|---|
| 4,446,686 A | | 5/1984 | Panuska et al. |
| 4,772,435 A | * | 9/1988 | Schlaeppi ........... B29C 47/0014 264/1.29 |

(Continued)

FOREIGN PATENT DOCUMENTS

| | | |
|---|---|---|
| EP | 0514091 A1 | 11/1992 |
| EP | 1017144 A1 | 7/2000 |
| GB | 2244568 A | 12/1991 |

OTHER PUBLICATIONS

International Preliminary Report on Patentability for PCT/IB2015/001714 dated Dec. 26, 2017 (7 pages).

(Continued)

*Primary Examiner* — Michael Stahl
(74) *Attorney, Agent, or Firm* — Shumaker, Loop & Kendrick, LLP

(57) ABSTRACT

A method of manufacturing an aerial micromodule cable with excess length of an optical core is disclosed, the cable comprising a cable jacket defining a cavity in which the optical core is arranged, said cable having two rigid strength members embedded in the wall of the jacket; the method comprising guiding the cable over a wheel; wherein a first plane (P1) intersecting the center of gravity (C1) of the cable cavity is parallel to a second plane (P2) intersecting the two rigid strength members, said first and second planes (P1, P2) being offset from each other, and wherein, during said guiding, the two rigid strength members are positioned closer to the wheel than the first plane (P1) so as to cause the optical core to have a core excess length of at least 0.05%.

14 Claims, 5 Drawing Sheets

(56) References Cited

U.S. PATENT DOCUMENTS

| | | | |
|---|---|---|---|
| 4,798,443 A | | 1/1989 | Knipe et al. |
| 4,836,639 A | | 6/1989 | Shamoto et al. |
| 4,859,025 A | * | 8/1989 | Houghton ............ G02B 6/4407 |
| | | | 385/114 |
| 4,921,413 A | * | 5/1990 | Blew .................... B29C 47/027 |
| | | | 264/178 R |
| 4,971,419 A | * | 11/1990 | Gartside ................ G02B 6/441 |
| | | | 264/1.28 |
| 5,109,457 A | | 4/1992 | Panuska et al. |
| 5,125,063 A | | 6/1992 | Panuska et al. |
| 5,163,116 A | * | 11/1992 | Oestreich ............ G02B 6/4403 |
| | | | 385/111 |
| 5,372,757 A | | 12/1994 | Schneider |
| 6,137,935 A | | 10/2000 | Boehme et al. |
| 7,397,992 B1 | * | 7/2008 | Blazer .................. G02B 6/4433 |
| | | | 385/106 |
| 2010/0109174 A1 | * | 5/2010 | Abernathy ........... G02B 6/4433 |
| | | | 264/1.29 |
| 2010/0266249 A1 | | 10/2010 | Bonicel |

OTHER PUBLICATIONS

International Search Report for PCT/IB2015/001714 dated Mar. 30, 2016 (3 pages).

* cited by examiner

AERIAL MICROMODULE OPTICAL CABLE AND A METHOD OF MANUFACTURING SAID CABLE

1. TECHNICAL FIELD

The present invention relates generally to the field of aerial optical fiber cables and more particularly to aerial micromodule cables in which optical fibers are grouped to form a plurality of micromodules gathered as a cable.

2. BACKGROUND

When optical cables are installed in aerial, they are exposed to constant tensions and, as a result, they may be subject to undesirable elongations. The tensile forces applied to aerial optical cables depend in particular on the climatic elements (wind, ice, etc.), the physical specifications (length, weight, etc.) of the cables, and how the cables are installed on the field.

To limit elongation that may occur in aerial optical cables, such cables are usually made as small and light as possible. Lightweight and small cables can be produced using a micromodule cable design. In aerial micromodule cables, optical fibers are grouped to form one or plural micromodules gathered as a cable.

In aerial micromodule cables, and more generally in micromodule cables, the micromodule sheaths are thin and flexible, this resulting in a low resistance of these cables to external forces. In consequence, the cable jacket cannot be extruded tight over the cable core as this would cause excessive stress on the optical fibers, thereby increasing attenuation. In micromodule cables, the optical core formed by the optical fibers is therefore uncoupled from the cable jacket.

Additionally, the cable core is generally designed so as to exhibit some level of excess length relative to the length of the cable jacket (typically about 0.2%). Having such an excess fiber length (EFL) in the cable ensures that the optical fibers are not elongated unless the cable is loaded above a certain level of tension.

Conventional techniques are known to achieve a certain level of excess fiber length in micromodule cables.

Excess fiber length can be controlled to some extent by adjusting geometrical construction parameters of the cable jacket and optical core.

Document U.S. Pat. No. 5,125,063 (AT&T Bell Laboratories) discloses an optical fiber cable suited for aerial distribution use, for example, including in a preferred embodiment at least one bundle of optical fibers. The at least one bundle is disposed in a tubular member which is made of a plastic material suitable for use in a relatively wide temperature range and which is enclosed by a sheath system. A predetermined excess length of fiber is caused to be disposed in the tubular member. The excess length of each fiber is such that it is sufficient to avoid undue strains on the fiber as the cable core is exposed to the elements and to forces imparted during handling such as during installation. This document makes reference to a manufacturing technique described in document U.S. Pat. No. 4,446,686 (AT&T Bell Laboratories) to obtain core excess length.

More particularly, document U.S. Pat. No. 4,446,686 discloses that, in the manufacture of a lightguide fiber cable in which a lightguide fiber core is loosely disposed in a composite sheath, it is important to control the ratio of the lengths of the core and sheath. A core which is shorter than the sheath and which follows a shortened path on a reel may be unduly strained when the cable is installed in the field. This problem is overcome by coupling the core to the sheath by a system which includes a constant speed linear capstan and a relatively large variable speed sheave that is positioned between the linear capstan and a takeup reel. The coupling of the core to the sheath is accomplished on the sheave after the sheath is elongated between the linear capstan and the sheave. The coupling and the elongation cooperate to compensate for the inherent shortfall in core length which otherwise would occur when the cable is wound on a reel. As a result, when tension forces that have been applied to the sheath are reduced, the sheath, which includes strength members having relatively high modulus of elasticity, recovers to its original length and the ratio of the length of the core to that of the sheath becomes a predetermined value.

Document U.S. Pat. No. 5,372,757 discloses that a loose tube element including a plastic sheath containing a grease-like material and an optical fiber or bundle of optical fibers or a ribbon of optical fibers is pulled from an extruder crosshead through a cooling bath and around a constant speed capstan. The loose tube element travels around the constant speed capstan a number of times and as it exits the capstan it is subject to a tensile force provided by a variable torque control capstan. The tensile force causes elongation of the plastic sheath, causes the optical fiber to be pulled taut and thereby controls the ratio of fiber length to sheath length within the loose tube element. While subjected to the tensile force, the element is subsequently cooled, causing the elongation of the plastic sheath to become permanent and thus fixing the fiber-to-sheath length ratio. The fiber-to-sheath length ratio is not affected by variation in production line speed and the production line may operate at very high speeds while producing loose tube elements with consistent fiber-to-sheath length ratios. The loose tube element is then stored on a take-up reel or is used as a stranding element or core element in a fiber optic cable.

However, only a limited amount of excess fiber length can be achieved using a conventional cable manufacturing method such as one of those mentioned above. Further, employing for instance the manufacturing method of document U.S. Pat. No. 4,446,686 can be problematic since it generally requires applying important tensions to the cable jacket. It is not always practical or feasible on a production line to apply the required level of tensile forces to the sheath.

No conventional cable manufacturing method allows producing in an efficient and reliable manner aerial optical cables, more particularly aerial micromodule cables, with a sufficiently high excess fiber length so as to limit or avoid undesirable tensions in these cables during or after their installation on the operative field.

3. SUMMARY

An object of the present invention is to alleviate the drawbacks and insufficiencies resulting from the above-mentioned prior art.

In one particular embodiment of the invention, a method of manufacturing an aerial micromodule cable with excess length of an optical core is disclosed, said cable comprising a cable jacket, a wall of said cable jacket defining a cable cavity in which the optical core is arranged, said cable having two rigid strength members embedded in the wall of said cable jacket; said method comprising:
  guiding the aerial micromodule cable over the outer circumference of a wheel;
  wherein a first plane intersecting the centre of gravity of the cable cavity is parallel to a second plane intersecting the two rigid strength members in the cable jacket, said first plane and said second plane being offset from each other, and wherein, during said guiding, the two rigid strength members are positioned closer to the outer circumference of the wheel than the first plane so as to cause the optical core to have a core excess length of at least 0.05% relative to the length of the cable jacket.

The invention advantageously allows generating in a practical and reliable manner at least 0.05% overlength in the optical core of an aerial micromodule cable, this without applying undue tensions on the cable during its manufacturing.

According to a particular embodiment, during said guiding, the wheel rotates about a rotation axis parallel to said first plane and to said second plane.

According to a particular embodiment, the first plane is a median transverse plane of the cable.

According to another embodiment, the second plane is a median transverse plane of the cable.

According to a particular embodiment, the first plane is a plane of symmetry of the cable cavity.

According to a particular embodiment, the second plane divides the aerial micromodule cable into a first region and a second region, said first region comprising the first plane, wherein, during said guiding, the centre of gravity of the optical core is arranged in the first region of said cable such that the neutral axis of the cable is positioned between the centre of gravity of the optical core and the second plane.

According to another aspect of the invention, an aerial micromodule cable comprises:
- a cable jacket comprising a wall defining a cable cavity;
- an optical core arranged inside the cable cavity, said optical core being uncoupled from the cable jacket;
- said cable having two rigid strength members embedded in the wall of said jacket;
- wherein a first plane intersecting the centre of gravity of the cable cavity is parallel to a second plane intersecting the two rigid strength members in the cable jacket, said first plane and said second plane being offset from each other, and
- wherein said optical core has an excess length of at least 0.05% relative to the length of the cable jacket.

According to a particular embodiment, the cross section of the cable cavity is circular or ellipsoidal.

According to a particular embodiment, the optical core comprises at least one micromodule, each of said micromodule comprising 4 or 8 or 12 fibers.

According to a particular embodiment, the aerial micromodule cable further comprises a visible indicator on the outer periphery of the cable for indicating the direction according to which the cable is to be bent over a wheel during a guiding step in accordance to a manufacturing method as defined above so as to cause said optical core to have said excess length of at least 0.05%.

According to a particular embodiment, the first plane is a median transverse plane of the cable.

According to another particular embodiment, the second plane is a median transverse plane of the cable.

According to a particular embodiment, the first plane is a plane of symmetry of the cable cavity.

According to a particular embodiment, the second plane divides the aerial micromodule cable into a first region and a second region, said first region comprising the first plane, wherein the centre of gravity of the optical core is arranged in the first region such that the neutral axis of the cable is positioned between the centre of gravity of the optical core and the second plane.

While not explicitly described, the present embodiments may be employed in any combination or sub-combination.

5. BRIEF DESCRIPTION OF THE DRAWINGS

The invention can be better understood with reference to the following description and drawings, given by way of example and not limiting the scope of protection, and in which.

The components in the figures are not necessarily to scale, emphasis instead being placed upon illustrating the principles of the invention.

6. DETAILED DESCRIPTION

The present invention relates to aerial optical cables, and more particularly to aerial micromodule cables. Many specific details of the invention are set forth in the following description and in FIGS. 1 to 8. One skilled in the art, however, will understand that the present invention may have additional embodiments, or that the present invention may be practiced without several of the details described in the following description.

Figure 1:
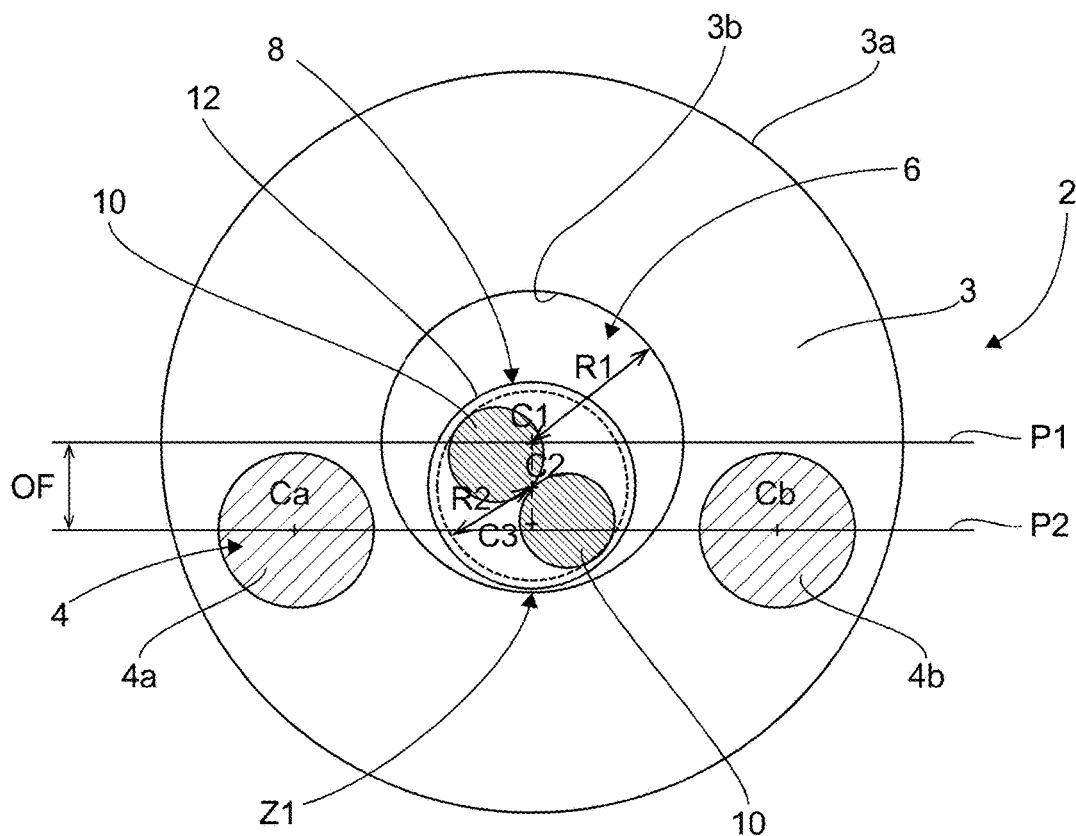
FIG. 1 is a schematic view of a transverse cross section of a cable according to an embodiment of the invention.

FIG. 1 schematically illustrates an aerial micromodule cable 2 comprising a sheath (or jacket) 3 that defines the outline of cable 2. Cable sheath 3 is for instance made of a plastic material such as high-density polyethylene (HDPE), polyvinyl chloride (PVC), halogen free flame retardant (HFFR) material, polybutylene terephthalate (PBT) or nylon.

The inner wall 3b of sheath 3 defines a longitudinal cavity 6 in which an optical core 8 is disposed. In the present example, the cross section of cavity 6 is circular, the radius of which being noted R1. Other shapes of the cavity 6 may however be contemplated.

Still in this example, the optical core 8 comprises a layer of yarns 12 (aramid yarns for instance), which are cabled around at least one micromodule 10 (that is, two micromodules 10 in the present example). Alternatively, the layer of yarns 12 can be replaced by a tape. Each micromodule 10 in optical core 8 comprises a number of optical fibers (for instance 4, 8 or 18). It should be noted however that other embodiments of the optical core 8 may be contemplated. More generally, optical core 8 contains at least one micromodule 10.

Optical core 8 thus includes in this example two micromodules that only partially fill the central cavity 6. This configuration allows for a certain amount of overlength of the optical core as explained in more details below.

The optical core has, in this example, a circular cross section, the radius of which being noted R2. Other physical arrangements may however be contemplated.

Sheath 3 exhibits a certain thickness which value being equal to the distance between its inner wall 3b and its outer wall 3a.

The optical core 8 is uncoupled from sheath 3. In other words, the optical core 8 is loosely arranged within the cable cavity 6 so that it can freely move radially and/or longitudinally to a certain extent relative to the cable sheath 3. In this example, the optical core 8 is in contact with the inner wall 3b of the cable sheath 3 in a contact area Z1, as shown in FIG. 1.

Cable 2 is provided with two rigid strength members (RSM) 4a and 4b (collectively referred to as 4) embedded in the wall of cable jacket 3. In this example, the two rigid strength members 4 extend longitudinally within cable jacket 3.

The rigid strength members 4 are designed to support most of the traction and compression forces when cable 3 is subject to mechanical and/or thermal stress. The rigid strength members 4 exhibit a Young's modulus (or elastic modulus) and rigidity greater than that of the remaining part of the cable sheath 3. The rigid strength members 4 may be rods of glass-reinforced plastic, known as GRP, or stranded or single-strand galvanized steel rods or aramide-reinforced plastic rods or any other suitable longitudinal reinforcing members for stiffening an aerial micromodule cable.

A first plane P1, intersecting the centre of gravity C1 of the cable cavity 6, is arranged such that it is parallel to a second plane P2 intersecting the two rigid strength members 4 embedded in the cable jacket 3. By "intersecting the two rigid strength members", it is meant that the centre of gravity of each of the two rigid strength members 4 are contained in plane P2.

By "centre of gravity" of the cable cavity, it is meant the centroid or geometric center of the cross section of the empty cable cavity.

The first plane P1 and the second plane P2 are offset from each other. In this example, planes P1 and P2 are parallel and spaced apart by an offset OF>0. As can be seen in FIG. 1, the centre of gravity C1 of the cavity 6 is positioned in plane P1 while the respective axes of symmetry Ca, Cb of the rigid strength members 4a, 4b are positioned in plane P2.

As already indicated, the cross-section of cavity 6 is circular in shape in the present example. Accordingly, the first plane P1 is a plane of symmetry of cavity 6, and will be designated as such thereinafter. It should be noted, however, that other shapes and arrangements of the cable cavity 6 may be contemplated wherein the first plane P1 is or is not a plane of symmetry of the cavity 6, depending on each case.

In this example, the plane of symmetry P1 is a median transverse plane of the cable 2.

Still in this example, the centre of gravity C2 of the optical core 8 and the neutral axis C3 of cable 2 are both positioned between planes P1 and P2. Neutral axis C3 (or neutral bending axis) is such that no contraction and extension occurs in said cable 2 at the neutral axis C3 when the cable is bent in the direction perpendicular to P2.

By "centre of gravity" of the optical core, it is meant the centroid or geometric centre of the cross section of the optical core, without considering the mass of the different materials forming the optical core. In this example, the centre of gravity C2 is the longitudinal axis of symmetry of optical core 8.

An overlength of the optical core 8 (and thus of the micromodules 10) is provided inside the cavity 6 of the cable 2. More particularly, cable 2 is arranged such that the optical core 8 has an excess fiber length (EFL) (or core excess length) of at least 0.05% relative to the length of the cable jacket 3.

Figure 2:
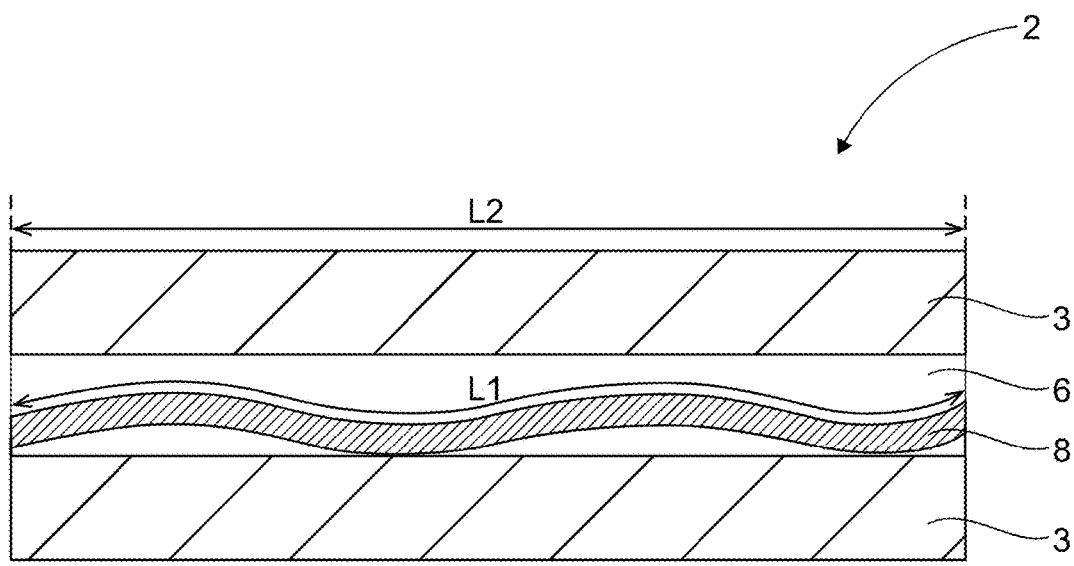
FIG. 2 is a schematic view of a longitudinal cross section of the cable depicted in FIG. 1.

As schematically illustrated in FIG. 2, the optical core 8 and the cable jacket 3 have respectively a length of L1 and L2. It follows that the cable 2 exhibits an excess fiber length EFL (i.e. a ratio of the optical core length to the sheath length) that can be defined as follows:

$$EFL = 100[(L1-L2)/L2]$$

As indicated earlier, overlength of the optical core is made possible notably since said core only partially fills the cable cavity 3.

A method of manufacturing the aerial micromodule cable 2 according to a particular embodiment will now be described in reference with FIGS. 3 to 5.

Figure 3:
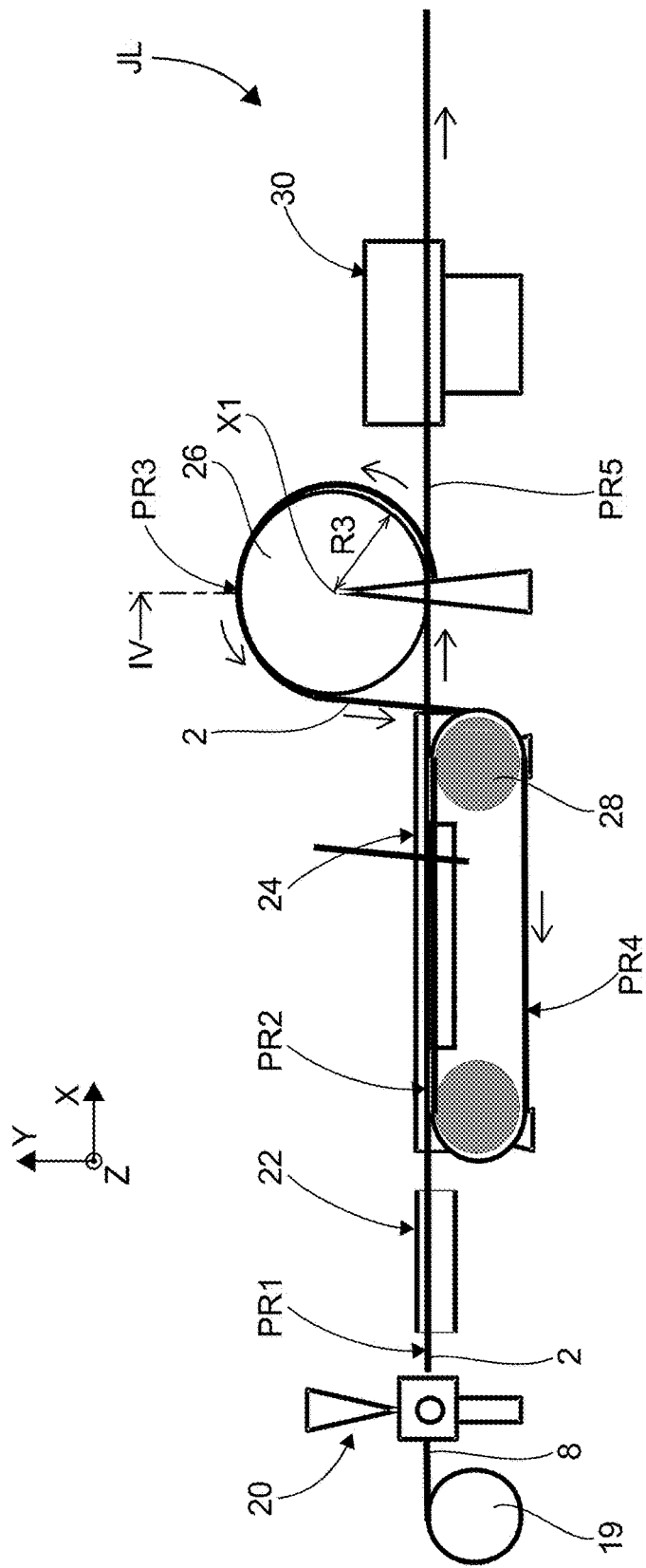
FIG. 3 is a schematic view of a cable jacketing line used in the method of manufacturing according to an embodiment of the invention.

FIG. 3 schematically shows a cable jacketing line JL used in the present example to produce cable 2 as described with reference to FIGS. 1 and 2. Some components and details of the cable jacketing line JL have been voluntarily omitted for a matter of clarity.

The cable jacketing line JL comprises the following components: an optical core pay off device 19, an extruder 20, a $1^{st}$ cooling device 22, a $2^{nd}$ cooling device 24, a coupling wheel 26 and a pulling device 30.

During the process of manufacturing, the cable 2 delivered by the extruder 20 is moved forward along a process path so as be processed successively by the $1^{st}$ cooling device 22, the $2^{nd}$ cooling device 24, the coupling wheel 26 and once again the $2^{nd}$ cooling device 24. In the present example, advancement of the cable 2 along the process path is achieved by pulling said cable 2 using the pulling device 30 (e.g. a caterpillar). The coupling wheel 26 is an idle wheel, which can freely rotate about a rotation axis X1. In an alternative embodiment, the coupling wheel 26 is motorized.

In step S2 (FIG. 5), extruder 20 provides cable 2 which comprises the cable jacket 3 (in which rigid strength members 4a, 4b are embedded) extruded around the optical core 8, said optical core 8 being disposed longitudinally within the cable cavity 3 defined by the inner wall 3b of said cavity. In this example, extruder 20 is fed with optical core 8 by the optical core pay off device 19 positioned upstream with respect to extruder 20.

The portion of cable 2 coming out from extruder 20 is noted PR1. At this stage, optical core 8 is uncoupled from the cable jacket 3 and there is no overlength of the optical core 8 relative to the cable jacket 3.

In step S4, the cable jacket 3 is then cooled successively by $1^{st}$ cooling device 22 and $2^{nd}$ cooling device 24. Cooling devices 22, 24 are for instance water-cooling through devices. The portion of cable 2 undergoing cooling treatment in cooling devices 22 and 24 is noted PR2.

The coupling wheel 26 (a sheave in this example) is installed so that it constitutes the first wheel that receives the cable 2 after the extruder 20. As such, wheel 26 operates as a coupling point of the cable jacket 3 and the cable core 8. The radius of the coupling wheel 26 is noted R3.

In a guiding step S6, the cable 2 is thus guided over the outer circumference of the coupling wheel 26. FIG. 4 schematically shows a transverse cross section of the portion PR3 of the cable 2, which is guided over the coupling wheel 26 in step S6. As can be seen in this example, the outer circumference 27 of the coupling wheel 26 forms a groove in which a portion PR3 of cable 2 is disposed. A contact region Z2 of the cable jacket 3 thus cooperates with the outer circumference 27 of the wheel 26.

It should be noted, however, that using a grooved wheel 26 is not mandatory to carry out the invention. In another embodiment, the outer circumference 27 of the coupling wheel 26 is flat or has any other appropriate shape.

During guiding step S6, the two rigid strength members 4 (i.e. their respective centers of gravity Ca, Cb) are positioned closer to the outer circumference 27 of the wheel 26 (and thus closer to the contact region Z2) than the first plane P1 so as to cause the optical core 8 to have a core excess length of at least 0.05% relative to the length of the cable jacket 3.

Thanks to the offset OF present between planes P1 and P2, a significant overlength of the optical core 8 relative to the length of the cable jacket 3 can be generated when cable 2 is bent along the coupling wheel 26. In this example, coupling wheel 26 rotates freely about the rotation axis X1 under the tension force applied on cable 2 by caterpillar 30.

In this particular example, both planes P1 and P2 are positioned parallel to the rotation axis X1 of the coupling wheel 26.

Figure 4:
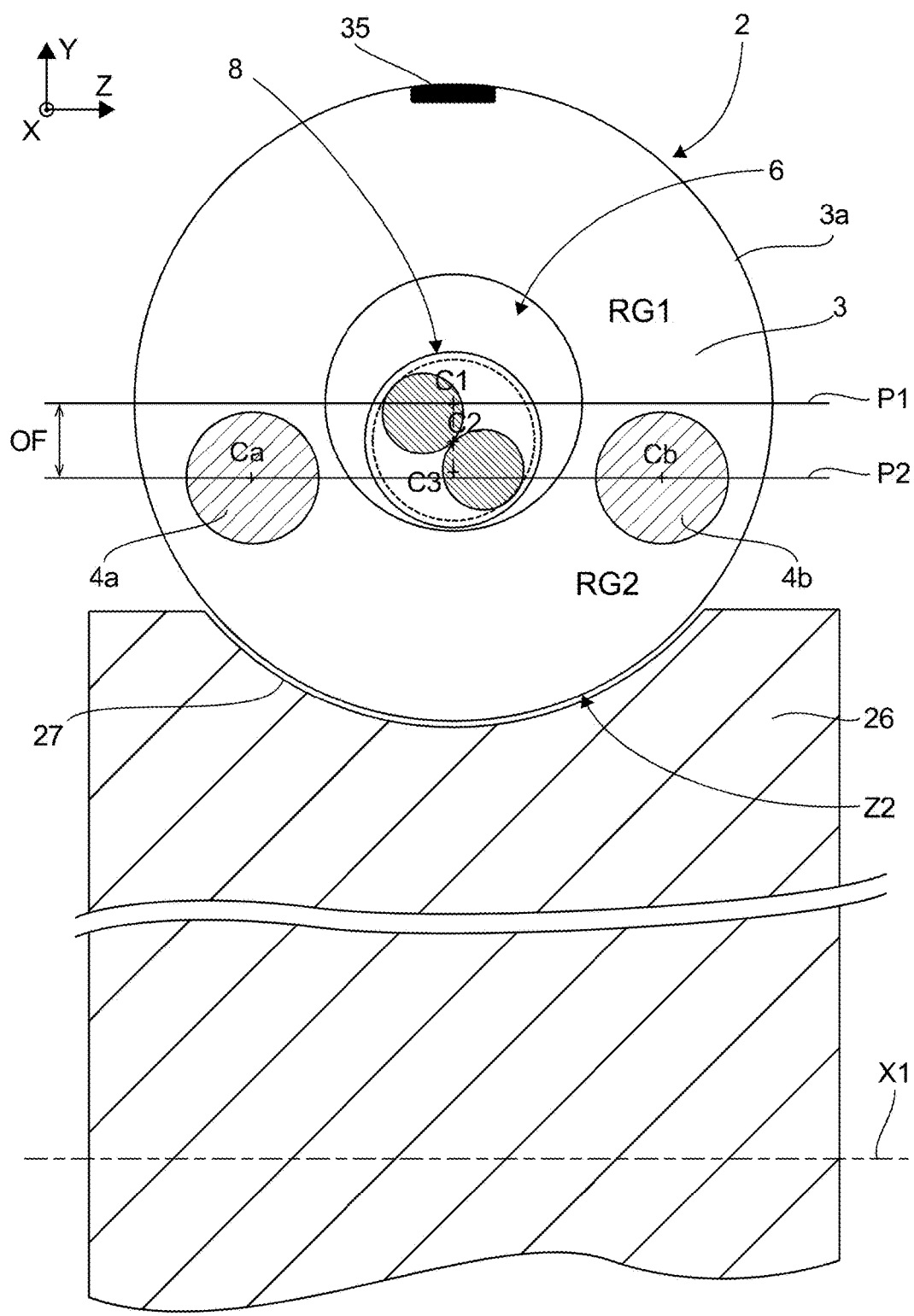
FIG. 4 is a schematic view of the cross section of the cable coupled to a wheel in a method of manufacturing according to an embodiment of the invention.
Figure 5:
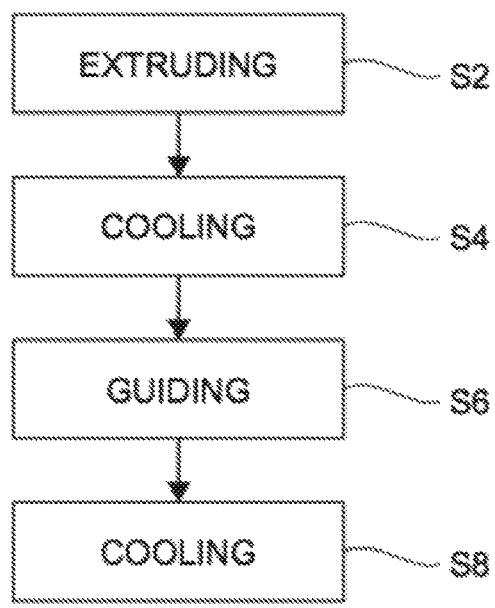
FIG. 5 is a flowchart representing the main steps of a method of manufacturing according to an embodiment of the invention.

Still in this example, the second plane P2 divides the aerial micromodule cable 2 into a first region RG1 and a second region RG2, wherein said first region R1 of the cable 2 comprises the first plane P1 (as shown in FIG. 4). In this example, during guiding step S6, the centre of gravity C2 of the optical core 8 is arranged in the first region RG1 such that the neutral axis C3 of the cable 2 is positioned between the centre of gravity C2 of the optical core 8 and the second plane P2. Other embodiments may however be contemplated.

Additionally, the cable 2 provided by extruder 20 may advantageously include a visible indicator 35 on the outer periphery of the cable for indicating the direction according to which the cable 2 is to be bent over the coupling wheel 26 during guiding step S6 so as to cause the optical core 8 to have an excess length of at least 0.05% as discussed earlier. The visible indicator 35 may be a marking, a relief (recess, protrusion . . . ) or have any other suitable form to inform as to how the cable 2 should be positioned relative to the coupling wheel 26 during the guiding step. In the present example, the visible indicator 35 is positioned on the outer surface 3a of the cable jacket 3, at a position opposite to the outer circumference 27 of the coupling wheel 26 during the guiding step S6.

Once step S6 is completed, the cable 2 is moved back (S8) to the 2$^{nd}$ cooling device 24 for further cooling. In this example, cooling device 24 comprises a wheel arrangement 28 to allow multiple passes of cable 2 within a cooling bath. The portion of cable 2 transported at step S8 through cooling device 24 is noted PR4.

The cable 2 is then extracted from cooling device 24 by caterpillar 30 for further treatment or handling (portion PR5 of cable 2).

As already mentioned, the embodiment represented in FIGS. 1 to 5 is provided as a mere example of the present invention.

Figure 6:
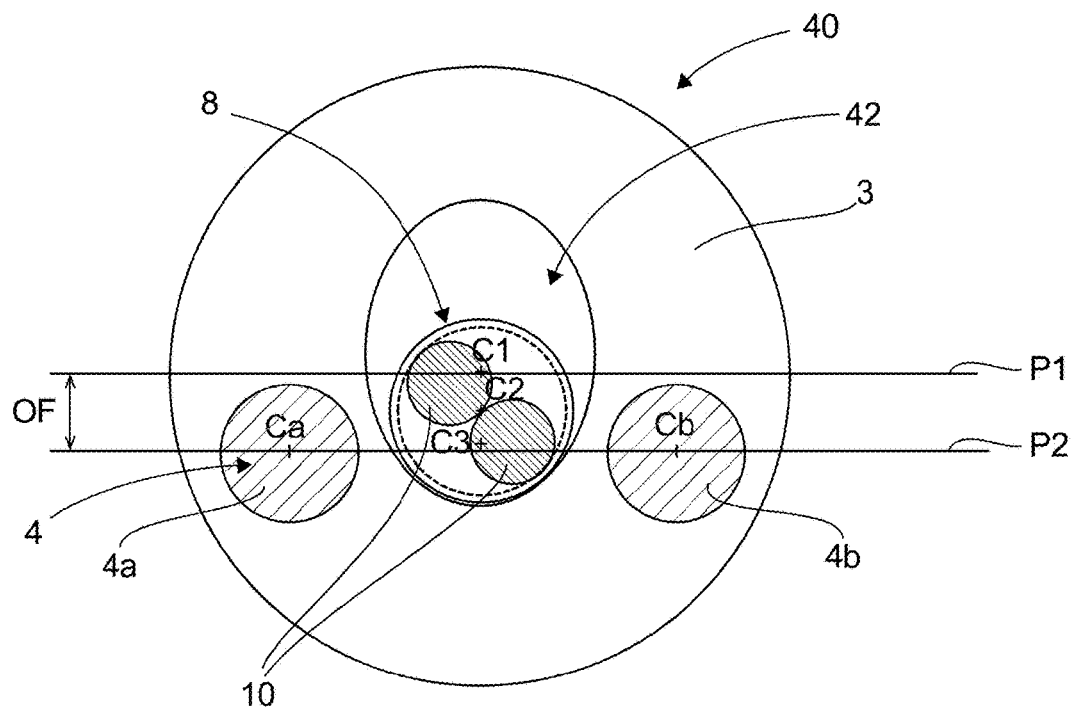
FIG. 6 is a schematic view of a transverse cross section of a cable according to another embodiment of the invention.

FIG. 6 is a transverse cross section of an aerial micromodule cable 40 according to another embodiment of the invention. Cable 40 differs from cable 2 in that the cross section of cable cavity (referenced 42 in this case) is ellipse-shaped. Other configurations of the cable cavity may be contemplated.

Figure 7:
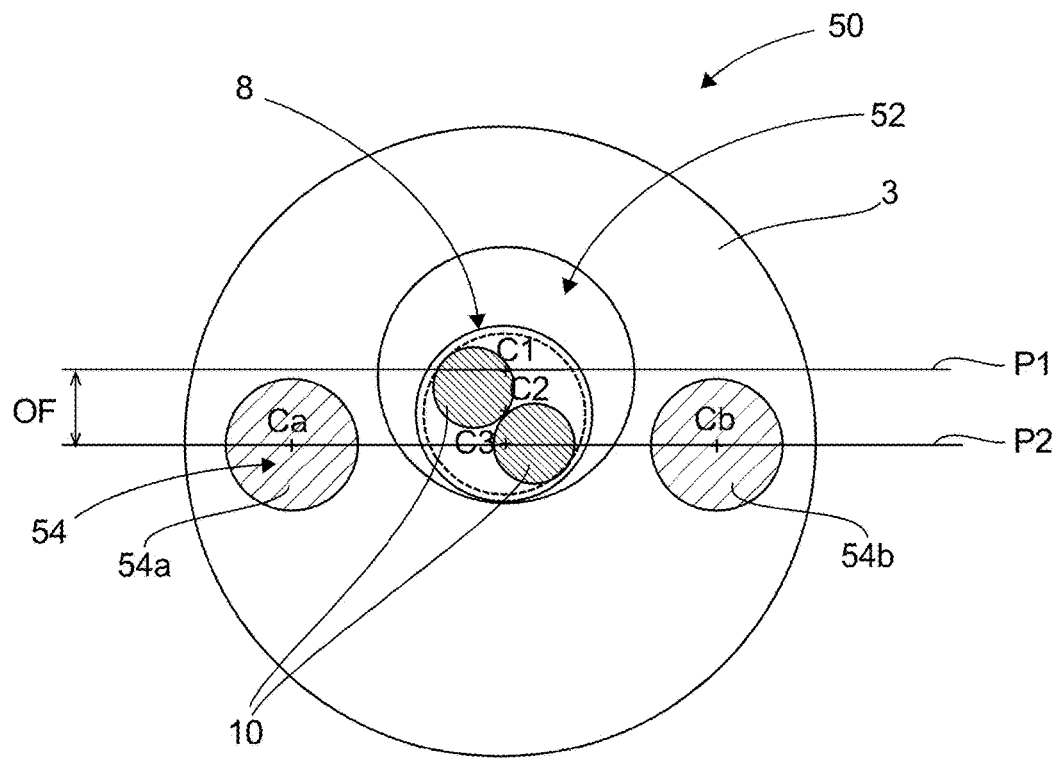
FIG. 7 is a schematic view of a transverse cross section of a cable according to still another embodiment of the invention.

FIG. 7 is a transverse cross section of an aerial micromodule cable 50 according to another embodiment of the invention. Cable 50 differs from cable 2 in that the plane of symmetry P1 of the cable cavity (referenced 52 in this case) is not a median transverse plane of the cable. In this alternative arrangement, it is the plane P2 intersecting the two rigid strength members (referenced 54a, 55b respectively in this case, and collectively 54) which is a median transverse plane of cable 50 parallel to plane P1. In other words, it is plane P1 which is off-centered relative to the median transverse plane of the cable instead of plane P2. Other embodiments may be contemplated where both planes P1 and P2 are off-centered relative to the median transverse plane of the cable, said planes P1 and P2 being still offset from each other as discussed earlier.

The invention advantageously allows generating at least 0.05% overlength in the optical core of an aerial optical cable, and more particularly of an aerial micromodule cable. As mentioned above, aerial cables are subject to constant tension. Generating at least 0.05% overlength ensures that, most of the time, the optical core (thus the optical fibers) is not tensioned. Occurrence of limited tension within the optical core can be tolerated over short periods of time due to the climatic elements for instance (e.g. wind and/or ice loading). Thanks to the invention, excessive tension can however be avoided or reduced by producing an overlength of at least 0.05% using a manufacturing method based on the principle illustrated above with reference to FIGS. 3 to 7.

Conventional techniques such as mentioned earlier do not allow obtaining such level of core excess length in a simple and reliable manner. In particular, the invention advantageously obviates the need to apply significant tensions on the cable during manufacturing, as is generally the case in conventional techniques. When using the technique of document U.S. Pat. No. 4,446,686 for instance (see above), some limited level of core overlength can be obtained by causing elastic elongation of the cable jacket followed by relaxation thereof. Above a certain size of the rigid strength members embedded in the cable jacket, it becomes however difficult (if not impossible) to apply the necessary level of tensions in the cable jacket to attain at the desirable amount of core excess length. Applying important tensions in cable jacket is not a practical option as it requires adequate equipment to do so, such as an additional caterpillar, before the coupling point, a high pulling force being applied between this caterpillar end the pulling device 30 depicted in FIG. 3 in order to create an elastic elongation of the jacket 3. By way of an example, considering a cable having two rigid strength members of 1.8 mm diameter each, the necessary pulling load between both caterpillars in order to create a 0.2% elastic elongation of jacket 3 would be about 500 N (newtons). As an alternative solution, one may consider applying a high tension (about 250 N in this example) on each rigid strength member at their pay off equipment before the extruder.

In the present invention, core excess length of at least 0.05% can be achieved in an aerial micromodule cable by playing with the geometrical arrangement of the cable and the positioning thereof with respect to the coupling wheel.

The amount of core excess length can be advantageously controlled in the invention by adjusting any of the following parameters:
 the diameter of the coupling wheel 26;
 the diameter of the cable cavity 6;
 the value of the offset OF;
 the diameter of the optical core 8.

The invention is advantageous in that the core excess length which is generated in the cable does not depend on the line speed during manufacturing as is the case in the technique of document U.S. Pat. No. 4,446,686 for instance.

Figure 8:
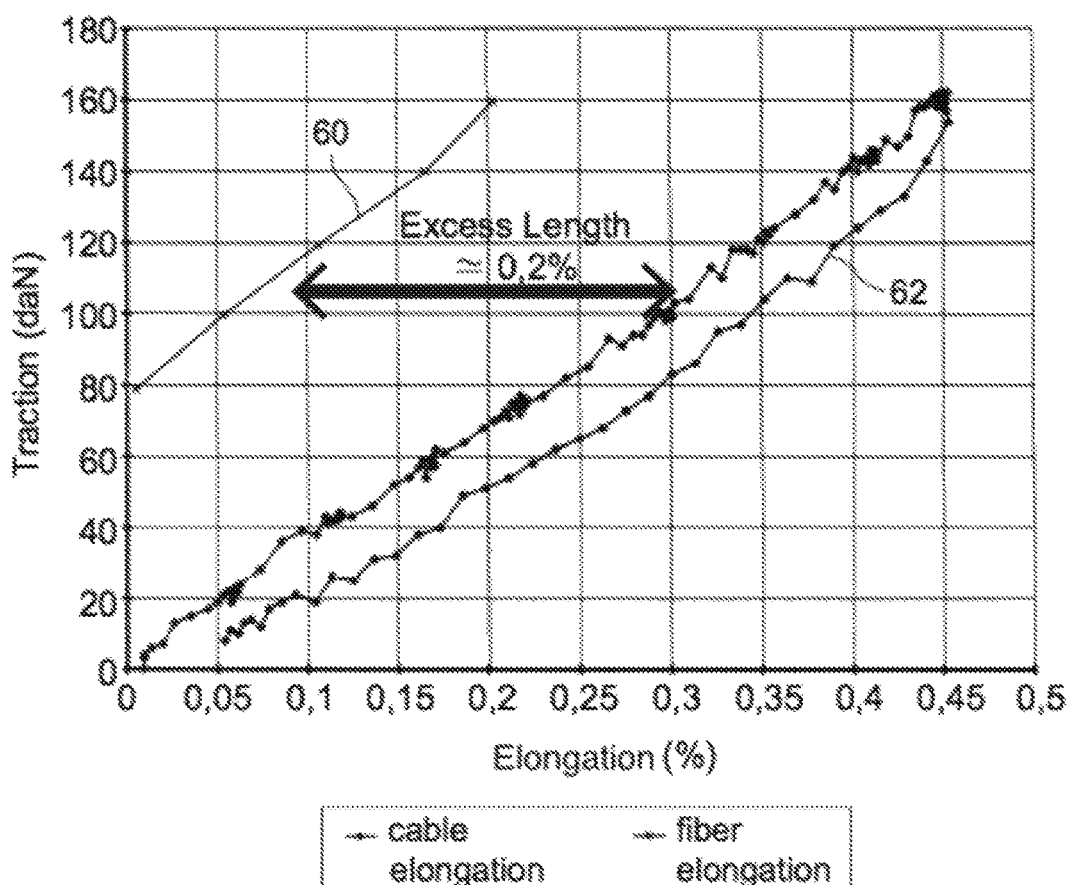
FIG. 8 is a graph illustrating experimental results obtained with a particular embodiment of the invention.

FIG. 8 shows experimental results obtained by manufacturing an aerial micromodule cable according to a particular embodiment of the invention, wherein:
- the diameter of the coupling wheel is 2.6 m;
- the diameter of the cable cavity is 4 mm;
- each of the two rigid strength members 4 has a diameter of 1.8 mm;
- the offset OF=0.8 mm;
- the diameter of the optical core 3 mm.

As illustrated in FIG. 8, a core excess length of approximately 0.2% can be observed between curve 60 representing core elongation and curve 62 representing cable elongation.

One skilled in the art, however, will understand that the embodiments described above are provided for illustrative purpose only and that these embodiments may be employed in any combination or sub-combination.

The invention claimed is:

1. A method of manufacturing an aerial micromodule cable with excess length of an optical core, said cable comprising a cable jacket, an inner wall of said cable jacket defining a cable cavity in which the optical core is arranged, said cable having two rigid strength members embedded in the wall of said cable jacket;
said method comprises:
extruding said cable jacket around said optical core, to provide said cable, said optical core having no overlength relative to the cable jacket;
guiding the aerial micromodule cable over an outer circumference of a coupling wheel; said coupling wheel being the first wheel that receives the cable after said extruding; and
wherein, a first plane intersecting a center of gravity of the cable cavity is parallel to a second plane intersecting the two rigid strength members in the cable jacket, said first and second planes being offset from each other,
and wherein, during said guiding, the two rigid strength members are positioned closer to the outer circumference of the coupling wheel than the first plane so as to cause the optical core to have a core excess length of at least 0.05% relative to the length of the cable jacket.

2. The method according to claim 1, wherein during said guiding, the coupling wheel rotates about a rotation axis parallel to said first plane and to said second plane.

3. The method according to claim 1, wherein the first plane is a median transverse plane of the cable.

4. The method according to claim 1, wherein the second plane is a median transverse plane of the cable.

5. The method according to claim 1, wherein the first plane is a plane of symmetry of the cable cavity.

6. The method according to claim 1, wherein the second plane divides the aerial micromodule cable into a first region and a second region, said first region comprising the first plane,
wherein, during said guiding, the center of gravity of the optical core is arranged in the first region such that the neutral axis of the cable is positioned between the center of gravity of the optical core and the second plane.

7. An aerial micromodule cable comprising:
a cable jacket comprising a wall defining a cable cavity;
an optical core comprising a layer of yarns or a tape, which is cabled around at least one micromodule
said optical core being arranged inside the cable cavity, said optical core being uncoupled from the cable jacket and only partially filling the cable cavity;
said cable having two rigid strength members embedded in the wall of said jacket; and
said cable having a first plane that intersects a center of gravity of the cable cavity and is parallel to a second plane intersecting the two rigid strength members in the cable jacket, said first plane and said second plane being offset from each other, wherein said optical core has an excess length of at least 0.05% relative to the length of the cable jacket.

8. The cable according to claim 7, wherein a cross-section of the cable cavity is circular or ellipsoidal.

9. The cable according to claim 7, wherein the optical core comprises at least one micromodule, each of said micromodule comprising 4 or 8 or 12 fibers.

10. The cable according to claim 7, further comprising a visible indicator on the outer periphery of the cable that indicates a cable bend direction so that the optical core has excess length of at least 0.05%.

11. The cable according to claim 7, wherein the first plane is a median transverse plane of the cable.

12. The cable according to claim 7, wherein the second plane is a median transverse plane of the cable.

13. The cable according to claim 7, wherein the first plane is a plane of symmetry of the cable cavity.

14. The cable according to claim 7, wherein the second plane divides the aerial micromodule cable into a first region and a second region, said first region comprising the first plane,
wherein the center of gravity of the optical core is arranged in the first region such that the neutral axis of the cable is positioned between the center of gravity of the optical core and the second plane.

* * * * *